United States Patent
Mori

(10) Patent No.: US 11,331,964 B2
(45) Date of Patent: May 17, 2022

(54) TIRE DAMAGE DETECTION SYSTEM AND TIRE DAMAGE DETECTION PROGRAM

(71) Applicant: BRIDGESTONE CORPORATION, Tokyo (JP)

(72) Inventor: Teppei Mori, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 5 days.

(21) Appl. No.: 17/057,951

(22) PCT Filed: Apr. 24, 2019

(86) PCT No.: PCT/JP2019/017486
§ 371 (c)(1),
(2) Date: Nov. 23, 2020

(87) PCT Pub. No.: WO2019/225276
PCT Pub. Date: Nov. 28, 2019

(65) Prior Publication Data
US 2021/0197629 A1 Jul. 1, 2021

(30) Foreign Application Priority Data
May 25, 2018 (JP) .............................. JP2018-100703

(51) Int. Cl.
*G06T 7/00* (2017.01)
*B60C 19/00* (2006.01)
*G06T 7/62* (2017.01)

(52) U.S. Cl.
CPC ............ *B60C 19/00* (2013.01); *G06T 7/0004* (2013.01); *G06T 7/62* (2017.01); *G06T 2207/30108* (2013.01); *G06T 2207/30252* (2013.01)

(58) Field of Classification Search
CPC ....... B60C 19/00; B60C 13/00; B60C 25/007; B60C 2200/065; G06T 7/0004;
(Continued)

(56) References Cited

U.S. PATENT DOCUMENTS

2014/0180528 A1\* 6/2014 Argue .................... G07C 5/006
701/31.4
2015/0042787 A1 2/2015 Douglas et al.
(Continued)

FOREIGN PATENT DOCUMENTS

DE 102016225154 A1 \* 6/2018 ............. B60K 28/08
JP 2015-161575 A 9/2015
(Continued)

OTHER PUBLICATIONS

Wiseman, Yair. "Camera that takes pictures of aircraft and ground vehicle tires can save lives." Journal of Electronic Imaging 22, No. 4 (2013): 041104. (Year: 2013).\*
(Continued)

*Primary Examiner* — Carol Wang
(74) *Attorney, Agent, or Firm* — Sughrue Mion, PLLC

(57) ABSTRACT

A tire damage detection system (10) is provided with an image data acquisition unit (120) which acquires image data including a rim wheel and a tire side part of a tire assembled to the rim wheel, a rim information acquisition unit (130) which acquires rim information including a radial size of the rim wheel associated with the tire, an damage detection unit (140) which detects an damage portion of the tire side part on the basis of the image data and detects a size of the damage portion with reference to a diameter of the rim wheel based on the rim information, and an output unit (150) which outputs information on the damage portion detected by the damage detection unit (140).

9 Claims, 6 Drawing Sheets

(58) Field of Classification Search
CPC ............ G06T 7/62; G06T 2207/30108; G06T 2207/30252; G01B 11/30
See application file for complete search history.

(56) References Cited

U.S. PATENT DOCUMENTS

| | | |
|---|---|---|
| 2015/0139498 A1 | 5/2015 | Rotatori et al. |
| 2016/0258842 A1 | 9/2016 | Taylor et al. |
| 2017/0124784 A1 | 5/2017 | Wittmann et al. |
| 2020/0108659 A1* | 4/2020 | Downey .................. B23P 6/00 |

FOREIGN PATENT DOCUMENTS

| | | | |
|---|---|---|---|
| JP | 2017-500540 A | 1/2017 | |
| JP | 2017-053819 A | 3/2017 | |
| JP | 2017-166942 A | 9/2017 | |
| JP | 6381094 B1 * | 8/2018 | ............ B60C 19/00 |
| JP | 2018-205164 A | 12/2018 | |
| KR | 10-2014-0021137 A | 2/2014 | |
| KR | 10-1556354 B1 | 10/2015 | |
| WO | 2015/041082 A1 | 3/2015 | |

OTHER PUBLICATIONS

Zhang, Sushi, Yuhong Wu, and Jun Chang. "Tire damage image recognition based on improved convolutional neural network." In 2020 IEEE International Conference on Information Technology, Big Data and Artificial Intelligence (ICIBA), vol. 1, pp. 1433-1437. IEEE, 2020. (Year: 2020).*
International Search Report for PCT/JP2019/017486 dated Jul. 16, 2019 (PCT/ISA/210).

* cited by examiner

TIRE DAMAGE DETECTION SYSTEM AND TIRE DAMAGE DETECTION PROGRAM

CROSS REFERENCE TO RELATED APPLICATIONS

This application is a National Stage of International Application No. PCT/JP2019/017486 filed Apr. 24, 2019, claiming priority based on Japanese Patent Application No. 2018-100703 filed May 25, 2018.

TECHNICAL FIELD

The present invention relates to a tire damage detection system and a tire damage detection program for detecting the external damage of a tire side part.

BACKGROUND ART

Conventionally, a technique for detecting the external damage of an object by analyzing image data obtained by imaging the object is known.

For example, a method has been proposed for detecting a crack on a concrete surface and the width (crack width) of the crack by performing image processing on image data obtained by imaging the surface of a concrete structure (See Patent Literature 1).

Specifically, Patent Literature 1 discloses that the width of a crack is detected by imaging a concrete structure and a scale capable of specifying the width of the crack together.

CITATION LIST

Patent Literature

[PTL 1] Japanese Unexamined Patent Application Publication No. 2017-53819

SUMMARY OF INVENTION

It is conceivable to apply the detection method of the crack and the width of the crack by the analysis of the image data as described above to the external damage detection of the tire side part of the tire (Tire for construction vehicle) mounted on the vehicle (Construction vehicle) traveling on an uneven ground such as a mine.

In the above-described crack detection method, in order to detect the size (width) of a crack, it is necessary to image a scale together with an object (Tire for construction vehicle). However, it is not easy to image the scale together with a construction vehicle traveling in a site such as a mine. It is possible to install the scale on the construction vehicle, but this is not practical as the surface of the scale will soon become dirty.

Therefore, it is an object of the present invention to provide a tire damage detection system and a tire damage detection program capable of detecting a damage of a tire side part without using a reference such as a scale.

One aspect of the present invention is a tire damage detection system including an image data acquisition unit (Image data acquisition unit 120) for acquiring image data including a rim wheel (Rim Wheel 30) and a tire side part (Tire side part 21a) of a tire (For example, a tire 21) assembled to the rim wheel, a rim information acquisition unit (rim information acquisition unit 130) for acquiring rim information including a radial size of the rim wheel associated with the tire; a damage detection unit (Damage detection section 140) for detecting a damage portion of the tire side part (Crack C) based on the image data and for detecting a size of the damage portion with reference to a diameter of the rim wheel based on the rim information, and an output unit (Output unit 150) for outputting information on the damage portion detected by the damage detection unit.

One aspect of the present invention is a tire damage detection program for causing a computer to execute an image data acquisition processing for acquiring image data including a rim wheel and a tire side part of a tire assembled to the rim wheel, a rim information acquiring process for acquiring rim information of the rim wheel associated with the tire, a damage detection process for detecting a damage portion of the tire side part based on the image data, and for detecting a size of the damage portion with reference to a diameter of the rim wheel based on the rim information, and an output processing for outputting information on the damage portion detected by the damage detection processing.

DESCRIPTION OF EMBODIMENTS

Figure 1:
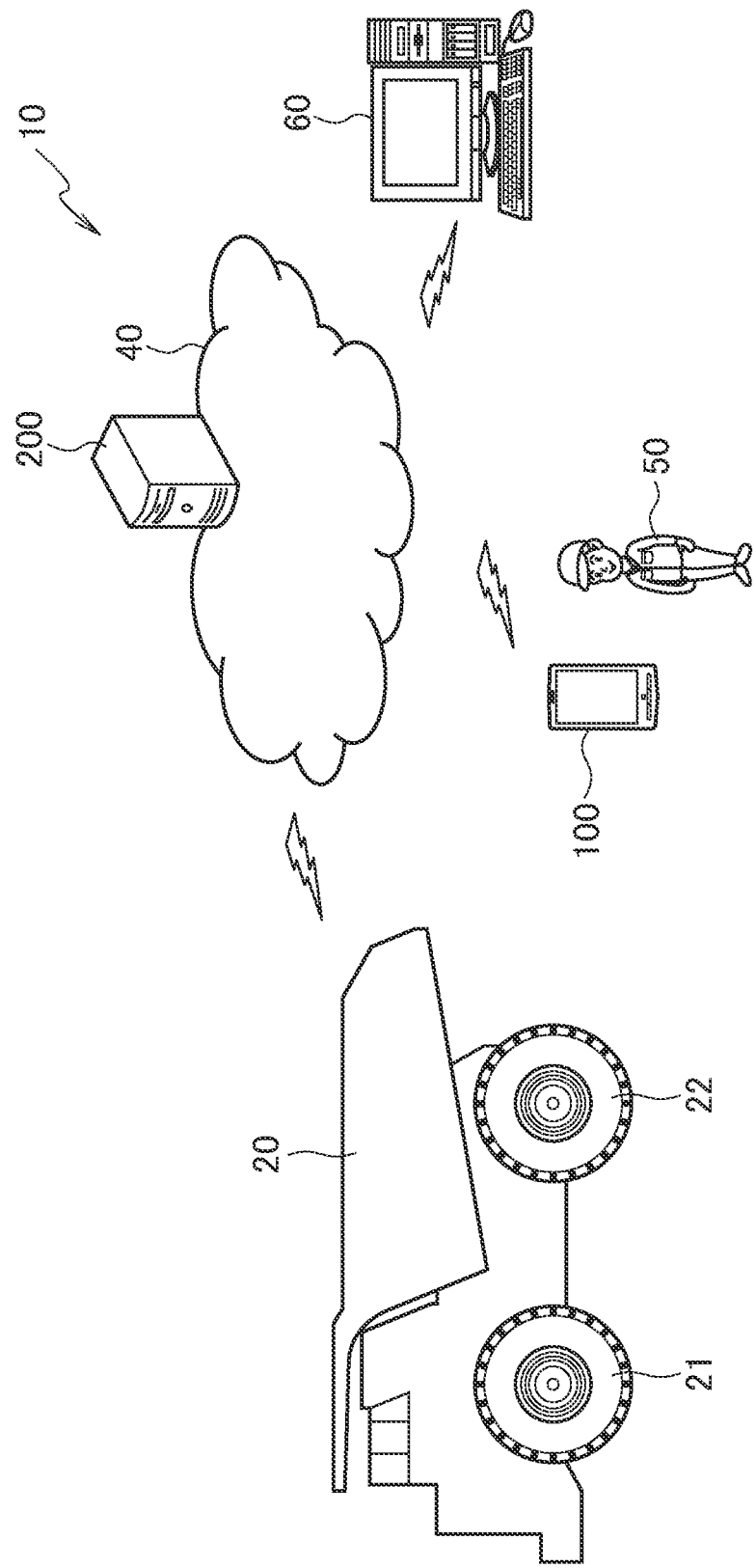
FIG. 1 is an overall schematic diagram of a tire damage detection system 10.

Hereinafter, an embodiment will be described based on the drawings. It should be noted that the same or similar reference numerals are given to the same functions and structures, and the description thereof will be omitted as appropriate.

(1) Overall Schematic Configuration of Tire Damage Detection System

FIG. 1 is an overall schematic configuration diagram of a tire damage detection system 10 according to the present embodiment. As shown in FIG. 1, the tire damage detection system 10 includes a terminal device 60, a portable terminal 100, and a tire information management server 200. The terminal device 60, the portable terminal 100 and the tire information management server 200 are connected through a communication network 40.

A construction vehicle 20 is a vehicle traveling on uneven ground such as a mine. Specifically, the construction vehicle 20 is a large dump truck. The construction vehicle 20 has a wireless communication function and can be connected to the tire damage detection system 10 via a communication network 40.

The construction vehicle 20 is mounted with a tire 21 and a tire 22. The tire 21 is mounted at a front wheel position, and the tire 22 is mounted at a rear wheel position. The configuration of the rear wheel may be a double tire.

Figure 2:
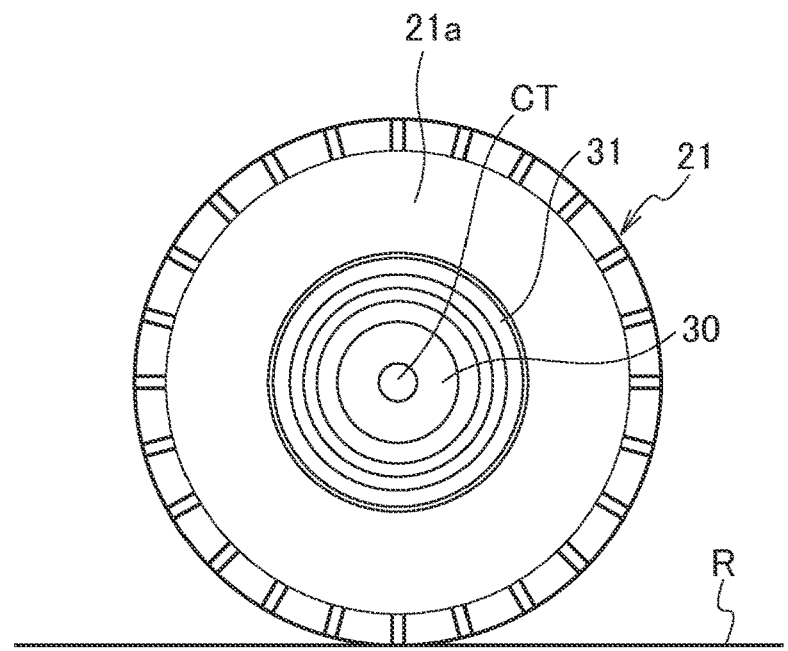
FIG. 2 is a side view of a single piece of tire 21.

Since the construction vehicle 20 travels on an uneven ground, a sharp stone or the like on the road surface R (Not shown in FIG. 1, see FIG. 2) tends to cause a cut flaw (crack) in the tire side part 21a (See FIG. 2). In particular, cracks are likely to occur in the tire side part 21a on the outer side when the vehicle is mounted with a tire.

The worker 50 is engaged in the operation of the construction vehicle 20. Specifically, the worker 50 manages the state of the tire 21 and the tire 22 mounted on the construction vehicle 20, and performs work corresponding to the necessity of tire replacement or repair. The worker 50 can use the terminal device 60 and the portable terminal 100.

The terminal device 60 is typically implemented by a personal computer located in a field management office (backyard), such as a mine. The terminal device 60 is used for retrieval and acquisition of tire information managed by the tire information management server 200.

The portable terminal 100 is typically implemented by a portable communication terminal such as a smartphone or tablet terminal that is connectable to a mobile communication network (PLMN). Similar to the terminal device 60, the portable terminal 100 is used for retrieval and acquisition of tire information managed by the tire information management server 200.

Further, in the present embodiment, the portable terminal 100 is also used for detecting the damage on the side surfaces of the tire 21 and the tire 22.

The tire information management server 200 manages information related to the tire 21 and the tire 22. Specifically, the tire information management server 200 holds the type of the construction vehicle 20, the sizes of the tires 21, the tires 22, and the rim wheels 30 (Not shown in FIG. 1, see FIG. 2), setting information (Set pressure according to load, etc.), and the use history (Driving time, distance traveled, presence/absence of attachment/detachment, etc.) of the tires 21 and 22 (Include a rim wheel 30).

The tire information management server 200 updates the use history or the like in response to an input from the terminal device 60 or the portable terminal 100.

FIG. 2 is a side view of the tire 21. As shown in FIG. 2, the tire 21 is assembled to the rim wheel 30. The tire 22 is also assembled to the rim wheel 30 like the tire 21.

The rim wheel 30 has a predetermined radial size (For example, 63 inches) corresponding to the specifications of the construction vehicle 20. An outer peripheral part of the rim wheel 30 is formed with a rim flange portion 31. The shape of the rim flange 31 (size) is different according to the specification of the rim wheel 30.

The radial size is a distance from the center CT of the rim wheel 30 to the radially outer end of the rim wheel 30, which is 2 times the linear distance (Diameter), and does not include the rim flange portion 31. That is, the radial size of the rim wheel 30 including the rim flange portion 31 may be different from the radial size of the rim wheel 30 not including the rim flange portion 31.

The outer diameter of the tire 21 is the sum of the radial size of the rim wheel 30 and the radial size of the tire side part 21a. The tire side part 21a refers to a portion from an inner end of a bead portion (not shown) of the tire 21 in a tire radial direction to a ground contact end of a tread portion (not shown) of the tire 21 with a road surface R in a tire width direction. However, the imaging range in the side view of the tire 21 may be interpreted as the tire side part 21a.

(2) Functional Block Configuration of Tire Damage Detection System

Next, a functional block configuration of the tire damage detection system 10 will be described. Specifically, the functional block configuration of the portable terminal 100 will be described. As described above, in the present embodiment, the portable terminal 100 is used for detecting the damage of the tire 21 and the side surface of the tire 22.

Figure 3:
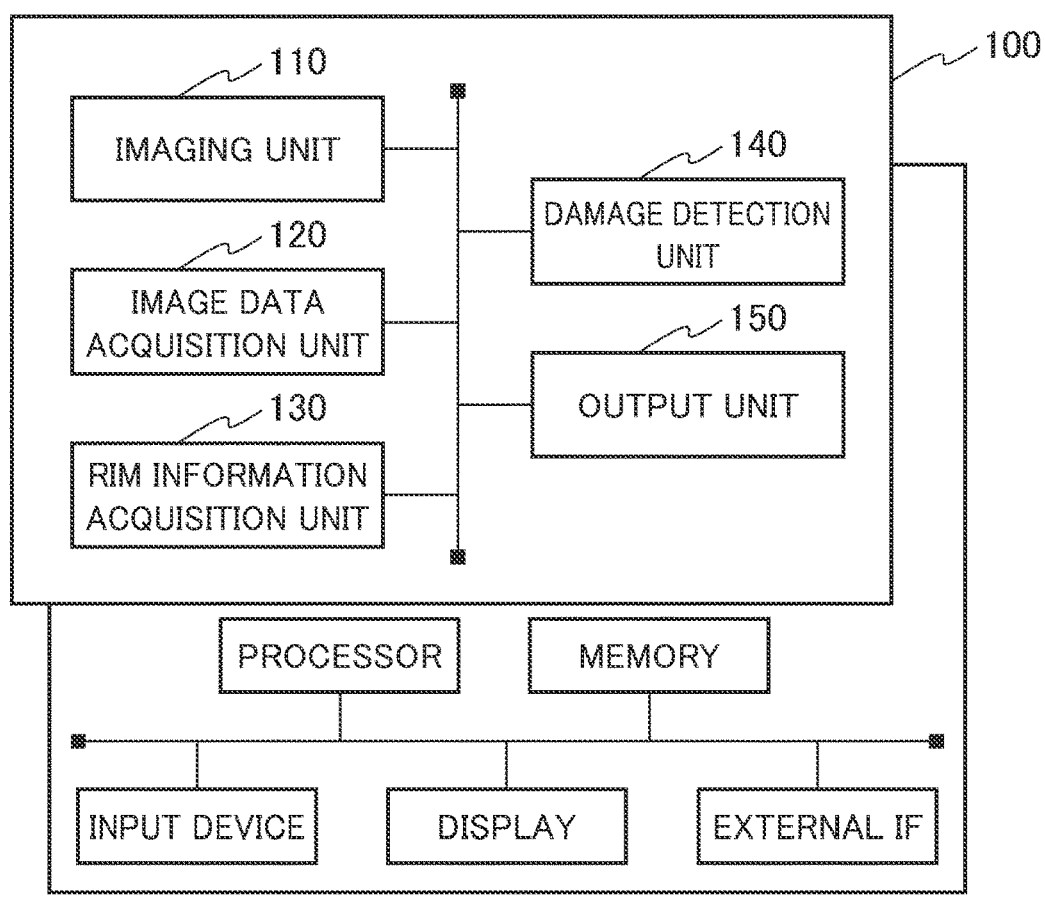
FIG. 3 is a functional block diagram of a portable terminal 100.

FIG. 3 is a functional block diagram of the portable terminal 100. As shown in FIG. 3, the mobile terminal 100 includes an imaging unit 110, an image data acquisition unit 120, a rim information acquisition unit 130, a damage detection unit 140, and an output unit 150.

These functional blocks are implemented by executing a computer program (Software) on hardware such as a server computer. Specifically, the portable terminal 100 includes a processor, a memory, an input device, a display, and an external interfaces as hardware elements. The computer program (Software) may be provided via the communication network 40 or may be recorded on a computer-readable recording medium such as an optical disk, a hard disk drive, or a flash memory.

The imaging unit 110 may be constituted by a digital camera element mounted on the portable terminal 100. Specifically, the imaging unit 110 images the side surface of the tire 21 (and the tire 22, and same as below). The imaging part 110 outputs image data of the side face of the tire 21.

The image data acquisition unit 120 acquires image data of the side face of the tire 21. The image data acquisition unit 120 basically acquires image data of the side surface of the tire 21 mounted on the construction vehicle 20. However, as long as the image data of the side surface of the tire 21 can be acquired with a degree of accuracy that does not affect the processing of the damage detection unit 140, the tire 21 may be removed from the construction vehicle 20.

Specifically, the image data acquisition unit 120 acquires image data including the rim wheel 30 and the tire side part 21a (See FIG. 2) of the tire 21 assembled to the rim wheel 30.

In the present embodiment, the image data acquisition unit 120 acquires image data of the side surface of the tire 21 imaged by the imaging unit 110. Note that the image data acquisition unit 120 may acquire image data of the side surface of the tire 21 acquired by another method instead of the imaging unit 110.

The rim information acquisition unit 130 acquires information of a rim wheel 30 associated with the tire 21 (rim information). Specifically, the rim information acquisition unit 130 acquires rim information including the radial size of the rim wheel 30.

As described above, the radial size is the diameter of the rim wheel 30 (Excluding rim flange portion 31) (For example, 63 inches), and the radial size of the tire 21 is also defined based on the diameter.

The rim information acquisition unit 130 may acquire the radial size inputted by the worker 50 to the portable terminal 100, or may provide a display capable of identifying the radial size in the tire side part 21a (such as letters or figures) and acquire the radial size based on the display.

Further, the rim information acquisition unit 130 may access the tire information management server 200 based on the peripheral information (e.g., type of construction vehicle 20 or tire size, etc.) input to the portable terminal 100 by the worker 50 to acquire the radial size.

Alternatively, the rim information acquiring unit 130 may acquire the radial size by reading the information of the RF tag attached to the tire 21 (Rim Wheel 30) using RFID (radio frequency identifier).

The rim information acquisition unit 130 can acquire rim information (rim type) including the radial size of the rim flange portion 31. As described above, since the radial size of the rim wheel 30 including the rim flange portion 31 can be different from the radial size of the rim wheel 30 not including the rim flange portion 31 (For example, 63 inches), the rim information acquisition unit 130 acquires the radial size of the rim flange portion 31.

That is, the outer diameter of the rim wheel 30 included in the image data of the side surface of the tire 21 is actually a size obtained by adding the radial size of the annular rim flange portion 31 to the specification diameter of the rim wheel 30.

A damage detection unit 140 detects a damage of the tire side part 21a. Specifically, the damage detecting unit 140 detects the damage portion of the tire side part 21a based on the image data acquired by the image data acquisition unit 120.

More specifically, the damage detection unit 140 detects a crack in the tire side part 21a. Since the construction vehicle 20 travels on an uneven ground, the tire side part 21a is liable to be damaged by cuts or the like due to unevenness of the road surface or the like. Since such a cut flaw grows as a crack in the tire side part 21a, it is desirable to detect such a cut flaw early and reliably. In particular, if the crack becomes larger than a predetermined length or width, the tire 21 needs to be replaced or repaired in order to cause air leakage or the like.

In the present embodiment, the damage detection unit 140 detects a candidate of a damage portion (crack) of the tire side part 21a included in the image data (damage candidate) by using an object recognition algorithm by deep learning and an area division algorithm.

Further, the damage detection unit 140 narrows down the damage candidates of the tire side part 21a on the basis of whether or not the damage candidate included in the image data is in a region darker than the periphery and in a shape narrower than the predetermined shape.

The damage detection unit 140 further inputs the narrowed down damage candidates to a deep learning classifier (deep learning determiner), and determines whether or not the damage candidates of the tire side part 21a are cracks. Thus, the damage detection unit 140 detects the damage portion of the tire side part 21a.

The damage detection part 140 detects the size of the damage portion with the diameter of the rim wheel 30 as a reference on the basis of the rim information acquired by the rim information acquisition unit 130.

Specifically, the damage detection unit 140 detects the size of the damage portion based on the ratio between the diameter of the rim wheel 30 included in the image data and the length and width of the damage portion.

In practice, since it is necessary to consider the radial size of the rim flange portion 31 as described above, the damage detecting portion 140 detects the size of the damage portion based on the diameter of the rim wheel 30 including the rim flange portion 31.

The damage detection unit 140 detects the width of a crack positioned within a prescribed range from a grounding portion where the tire 21 is grounded to the road surface R (See FIG. 2). In the case of detecting the crack width, if the crack is not located in the vicinity of the grounding portion, the crack does not open due to the load, and the detection of the crack width based on the image data becomes difficult.

The damage detection unit 140 detects, for example, a width of a crack located within a range of ±10-15° with respect to a center in a tire circumferential direction (direction of travel) of a grounding portion as a reference.

The output part 150 outputs information of the damage portion detected by the damage detection unit 140. Specifically, the output unit 150 can output the position, length and width of the crack generated in the tire side part 21a.

(3) Operation of the Tire Damage Detection System

Next, the operation of the tire damage detection system 10 will be described. Specifically, the operation of detecting the damaged portion of the tire side part by the tire damage detection system 10 (Portable Terminal 100) will be described. Hereinafter, the tire 21 will be described as an example, but the same operation is applied to the tire 22.

(3.1) Overall Operation Flow

Figure 4:
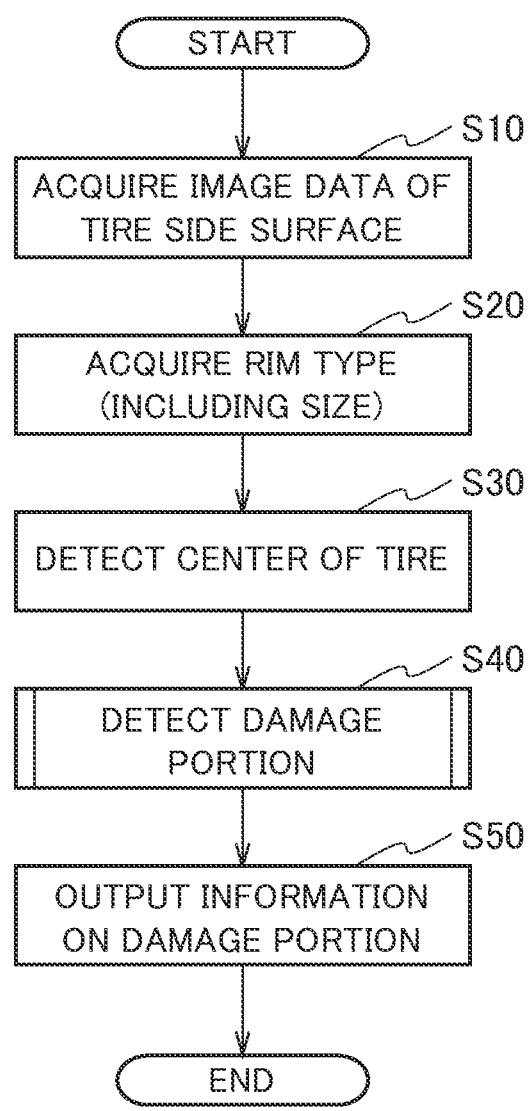
FIG. 4 is a diagram showing the overall operation flow of the portable terminal 100 for detecting the portion of the tire side part 21a that is damaged.

FIG. 4 shows an overall operation flow of the mobile terminal 100 for detecting the portion of the tire side part 21a that is damaged.

As shown in FIG. 4, the portable terminal 100 acquires image data of the side surface of the tire 21 (S10). Specifically, the portable terminal 100 acquires image data including the rim wheel 30 and the tire side part 21a. As described above, the portable terminal 100 may acquire the image data by a digital camera element mounted on the portable terminal 100, or may acquire the image data of the side surface of the tire 21 acquired by another method via the communication network 40 or the like.

Figure 6:
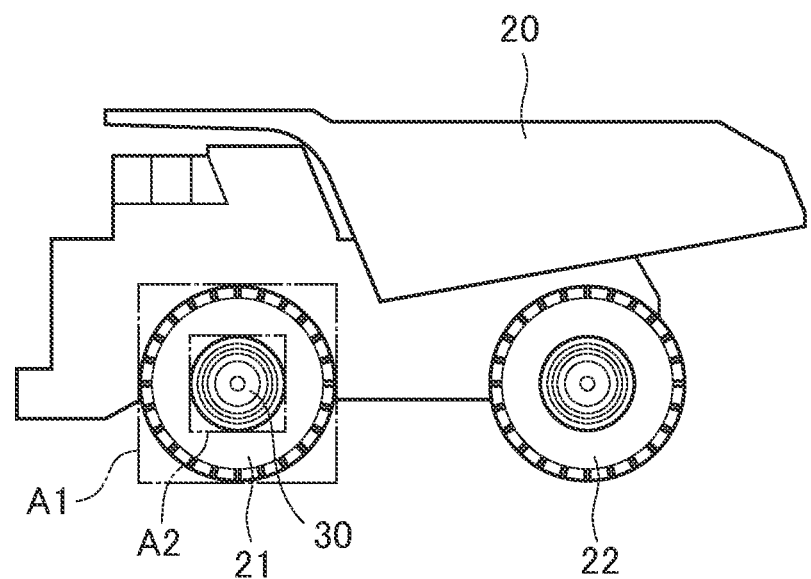
FIG. 6 is a diagram showing an area of the side surface of the tire 21 to be subjected to image data.

FIG. 6 shows an area of the side surface of the tire 21 to be subjected to image data. As shown in FIG. 6, the portable terminal 100 extracts an area A1 on the side surface of the tire 21 from the still image data including the construction vehicle 20. The portable terminal 100 cuts out an area A2 on the side surface of the rim wheel 30 (Include the rim flange portion 31) from the still image data included.

Note that the portable terminal 100 may change the size of the image data of the segmented areas A1 and A2 to a size that is easy to process, if necessary.

Figure 7:
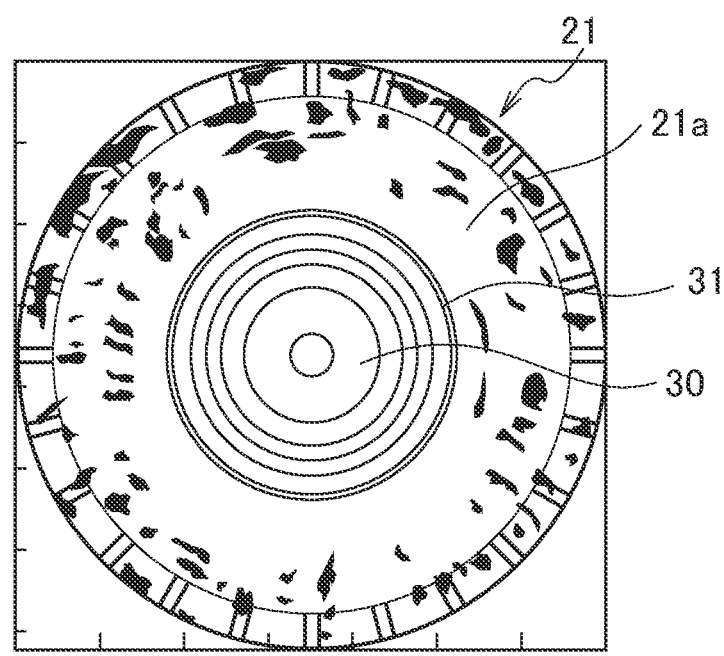
FIG. 7 shows an example of image data of a side surface of the tire 21.

FIG. 7 shows an example of image data of the side surface of the tire 21. As shown in FIG. 7, on the surface of the tire side part 21a, there are a large number of damages such as cracks and scratches, and stains (Black portion in the figure).

The portable terminal 100 acquires the rim type (see FIG. 7) of the rim wheel 30 (Including size) included in the acquired image data (S20). Specifically, the portable terminal 100 acquires, based on the radial size of the rim wheel 30 (For example, 63 inches) and the type of the rim flange portion 31 (rim type), the radial size of the rim wheel 30 including the rim flange portion 31 (For example, 63 inches+ 1.5 inches).

The portable terminal 100 detects, based on the acquired image data, the rim wheel 30, more specifically, the center CT (See FIG. 2) of the tire 21 assembled to the rim wheel 30 (S30).

Next, the portable terminal 100 detects a damaged portion (crack) of the tire side part 21a based on the acquired image data (S40). The operation of step 40 will be described later.

The portable terminal 100 outputs information on the detected damage portion (S50). Specifically, the portable terminal 100 outputs the position, length and width of the crack generated in the tire side part 21a.

The position of the crack may be indicated by a combination of the position in the tire radial direction and the angle of the tire 21 (or rim wheels 30) from the reference position (e.g., the position of the air valve) in the tire circumferential direction, or may be indicated by an image including the reference position and the position of the crack.

(3.2) Detailed Operation Flow of Damage Portion Detection

Figure 5:
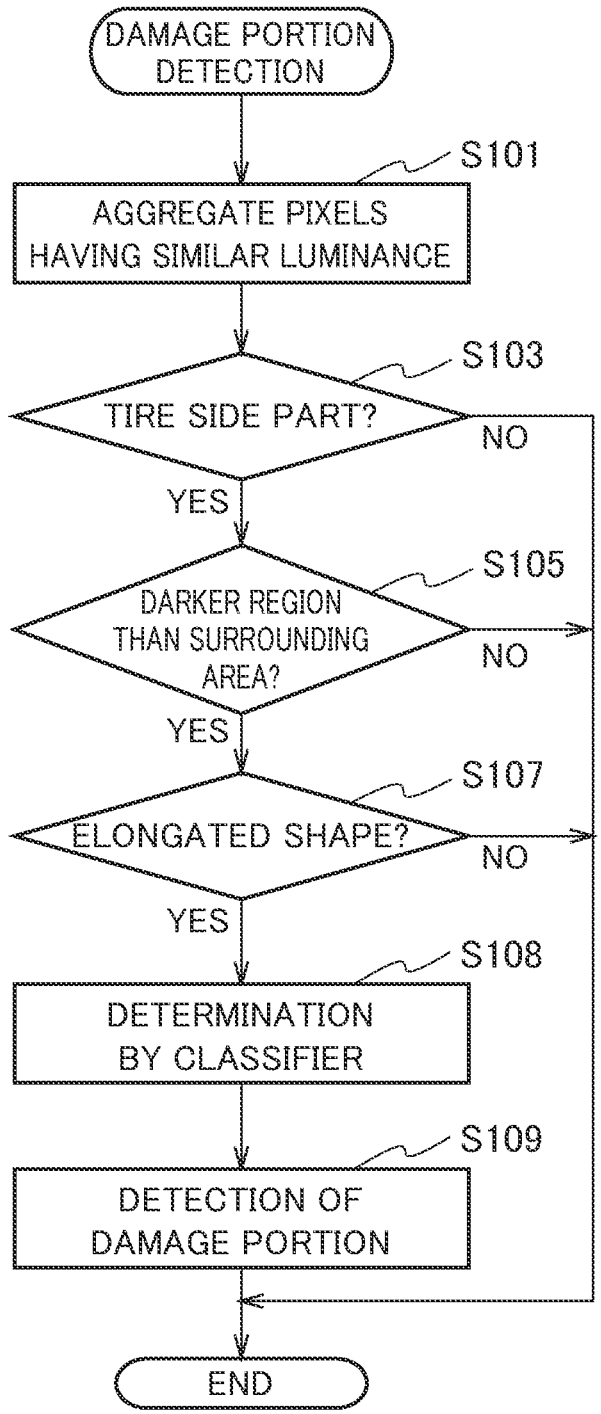
FIG. 5 is a diagram illustrating a detailed operational flow of damage portion detection.

FIG. 5 shows a detailed operational flow of damage portion detection. Specifically, FIG. 5 shows the detailed operation flow of the damage portion detection in step 40 described above.

As shown in FIG. 5, the portable terminal 100 aggregates pixels having similar luminance among the pixel information (pixels) contained in the extracted image data (see FIG. 7) (S101). Thus, the portable terminal 100 primarily selects the damage candidate included in the extracted image data.

The mobile terminal 100 determines whether or not the selected damage candidate is located in the tire side part 21a (S103).

The mobile terminal 100 determines whether the selected damage candidate is in a darker region than the surrounding area (S105). This is because among pixels having similar luminance, a region darker than the periphery is highly likely to be a crack.

Further, the portable terminal 100 determines whether or not the selected damage candidate has an elongated shape than the predetermined shape (S107). Specifically, the portable terminal 100 determines whether or not the damage candidate has a shape that is longer than the predetermined shape, based on whether or not the ratio (L/W) of the size of the damage candidate along the tire radial direction (Length L) to the size of the damage candidate along the tire circumferential direction (Width W) exceeds a predetermined value (For example, 2.0).

Next, the mobile terminal 100 inputs the detected damage candidate to the deep learning classifier, and determines whether or not the damage candidate is a crack (S108).

The portable terminal 100 detects, on the basis of the result of the processing in steps 103 to 108, a portion of the tire side part 21a that is presumed to be a crack (S 109). The portable terminal 100 finally selects a portion of the tire side part 21a which is presumed to be a crack by a classifier using deep learning.

The portable terminal 100 detects the size of the damage portion based on the ratio between the diameter of the rim wheel 30 and the detected length and width of the damage portion.

Figure 8:
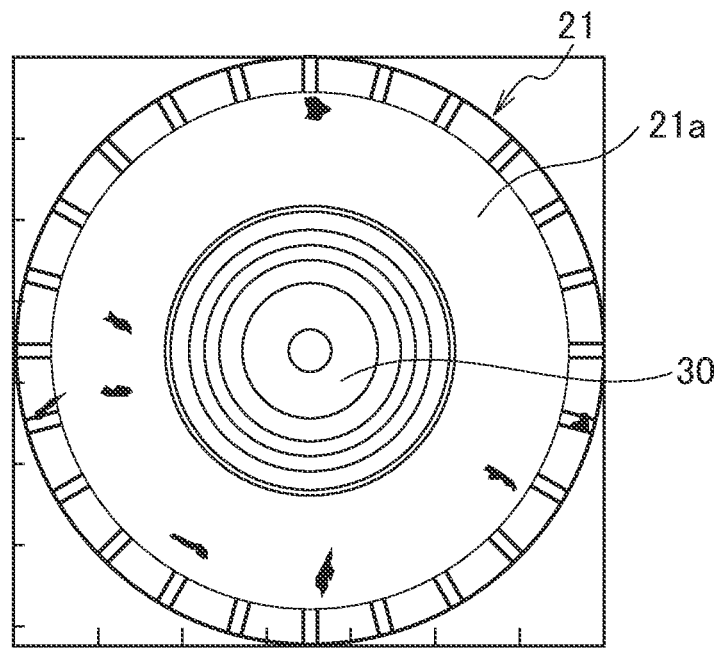
FIG. 8 shows an example of image data in which only the damage portion that was presumed to be a crack was selected.

FIG. 8 shows an example of image data in which only the portion of the damage estimated to be a crack is selected as a result of the processing up to step 109. Specifically, FIG. 8 shows a state after the detection processing of the damage portion is executed on the image data of the side surface of the tire 21 shown in FIG. 7.

As shown in FIG. 8, only the portion of the damage estimated to be a crack (Black portion in the figure) is displayed. In addition, the portion of the rim wheel 30 is not the object of detection of the damage portion.

Figure 9:
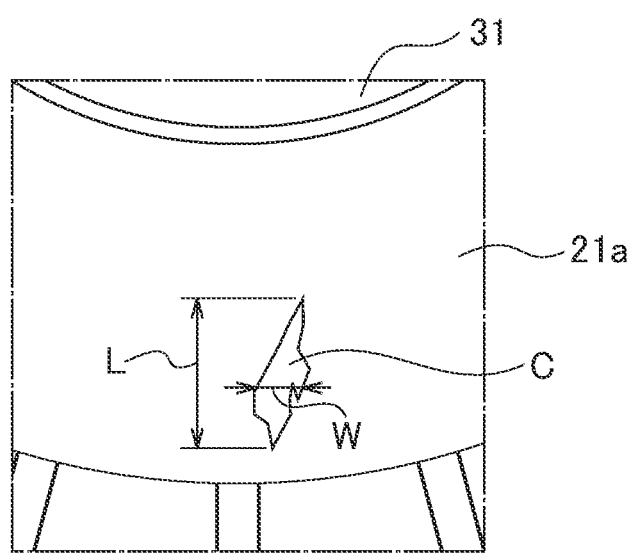
FIG. 9 is an enlarged view of a portion of the damage shown in FIG. 8.

FIG. 9 is a partially enlarged view of the damage portion shown in FIG. 8. As shown in FIG. 9, the crack C is elongated than the predetermined shape. Specifically, as described above, the ratio (L/W) of the length L of the crack C (damage candidate) along the tire radial direction to the width W of the crack C along the tire circumferential direction exceeds a predetermined value (For example, 2.0).

Note that the length L along the tire radial direction is not necessarily parallel to the tire radial direction, and may be slightly inclined according to the shape of the crack C.

(4) Function and Effects

According to the embodiment described above, the following effects can be obtained. Specifically, the tire damage detection system 10 (Portable terminal 100) detects the damage portion of the tire side part 21a based on image data including the rim wheel 30 and the tire side part 21a, and detects the size of the damage portion with reference to the diameter of the rim wheel 30 based on rim information. Further, the tire damage detection system 10 outputs information (Position, size) of the detected damage portion.

Therefore, by a relatively simple operation for acquiring image data including the rim wheel 30 and the tire side part 21a, the damaged portion (damage candidate) of the tire side part 21a can be easily detected. That is, according to the tire damage detection system 10, since the size of the damage portion can be detected based on the diameter of the rim wheel 30, it is not necessary to image a special reference such as a scale (ruler) together with the tire 21 (or tire 22).

That is, according to the tire damage detection system 10, the damage of the tire side part can be detected without using a reference such as a scale.

In the present embodiment, the tire damage detection system 10 detects a crack in the tire side part 21a as a damage portion on the basis of whether or not the candidate damage is in a region darker than the periphery and in an elongated shape than the predetermined shape. Therefore, cracks in the tire side part 21a can be more accurately detected while discriminating other damages (Scratches, etc.) and stains.

In this embodiment, the tire damage detection system 10 can detect the size of the damage portion with reference to the diameter of the rim wheel 30 including the rim flange portion 31. Therefore, even when a plurality of types of the rim flange portion 31 are specified, the exact size of the damage portion can be detected.

In the present embodiment, the tire damage detection system 10 detects the width W of a crack located within a predetermined range from a grounding portion where the tire 21 is grounded to the road surface R. This is because when detecting the width W, detecting the width W in a state where a crack is opened by a load is useful for determining replacement or repair of the tire 21.

In this embodiment, the tire damage detection system 10 can output the position, length L, and width W of the crack. Therefore, the worker 50 or the like can highly accurately judge the necessity of replacement or repair of the tire 21.

(5) Other Embodiments

While the contents of the present invention have been described in accordance with the above embodiments, it will be apparent to those skilled in the art that the present invention is not limited to these descriptions and that various modifications and improvements are possible.

For example, in the above-described embodiment, the size of the damaged portion is detected based on the diameter of the rim wheel 30 including the rim flange 31, but such a process is not necessarily required. Depending on the type of the construction vehicle 20 and the like, when only one type of the shape of the rim flange portion 31 is used, the diameter of the rim wheel 30 including the rim flange portion 31 may be used in advance.

In the embodiment described above, the damage detection unit 140 narrows down the damage candidates in the tire side part 21a on the basis of whether or not the damage candidates included in the image data are in a region darker than the periphery and whether or not the damage candidates are in a shape narrower than the predetermined shape, and inputs the narrowed down damage candidates into a classifier (deep learning determiner) by deep learning, and determines whether or not the damage candidates in the tire side part 21a are cracks. However, the damage candidates may be input directly to the classifier without the narrowing down.

In the above-described embodiment, the image data of the side surface of the tire 21 is acquired using the imaging unit 110 of the portable terminal 100. However, a fixed camera may be installed at a gate or the like through which the construction vehicle 20 passes to image the side surface of the tire 21 when the construction vehicle 20 passes.

In the above-described embodiment, the terminal device 60, the portable terminal 100, and the tire information management server 200 constitute the tire damage detection system 10, but not all devices are necessarily required. For example, the terminal device 60 is not essential. Alternatively, the function of the portable terminal 100 (Except the imaging unit 110) may be realized by the terminal device 60. The information managed by the tire information management server 200 may be stored in the portable terminal 100 (Memory).

In the above embodiment, a dump truck is described as an example, but other construction vehicles such as an articulated dump truck and a wheel loader may be used. Further, when the rear wheel of the construction vehicle 20 is a double tire, it is conceivable that image data of the side surface of the tire is acquired when the inner rear wheel is removed from the construction vehicle 20. However, as described above, in general, cracks are likely to occur in the tire side part 21a outer side where the vehicle is mounted with the tire, and therefore, cracks are relatively unlikely to occur in the inner rear wheels of the double tire.

Although embodiments of the invention have been described as described above, the discussion and drawings forming part of this disclosure should not be construed as limiting the invention. Various alternative embodiments, embodiments and operational techniques will be apparent to those skilled in the art from this disclosure.

REFERENCE SIGNS LIST 10 tire damage detection system
20 construction vehicle
21, 22 tires
21a tire side part
30 rim wheel
31 rim flange portion
40 communication network
50 workers
60 terminal device
100 portable terminal
110 imaging unit
120 image data acquisition unit
130 rim Information acquisition unit
140 damage detection unit
150 output unit
200 tire information management server

The invention claimed is:

1. A tire damage detection system, comprising:
an image data acquisition unit for acquiring image data including a rim wheel and a tire side part of a tire assembled to the rim wheel;
a rim information acquisition unit for acquiring rim information including a radial size of the rim wheel associated with the tire;
a damage detection unit for detecting a damage portion of the tire side part based on the image data, and for detecting a size of the damage portion with reference to a diameter of the rim wheel based on the rim information; and
an output unit for outputting information on the damage portion detected by the damage detection unit.

2. The tire damage detection system according to claim 1, wherein the damage detection unit detects a crack in the tire side part as the damage portion on a basis of whether or not a damage candidate included in the image data is in a region darker than a periphery and in a shape more elongated than a predetermined shape.

3. The tire damage detection system according to claim 2, wherein the damage detection unit detects a width of the crack located within a predetermined range from a grounding portion where the tire is grounded to a road surface.

4. The tire damage detection system according to claim 3, wherein the output unit outputs a position, length and the width of the crack.

5. The tire damage detection system according to claim 4, wherein the rim information acquisition unit acquires the rim information including a radial size of a rim flange portion of the rim wheel, and the damage detection unit detects the size of the damage portion based on the diameter of the rim wheel including the rim flange portion.

6. The tire damage detection system according to claim 2, wherein the rim information acquisition unit acquires the rim information including a radial size of a rim flange portion of the rim wheel, and the damage detection unit detects the size of the damage portion based on the diameter of the rim wheel including the rim flange portion.

7. The tire damage detection system according to claim 3, wherein the rim information acquisition unit acquires the rim information including a radial size of a rim flange portion of the rim wheel, and the damage detection unit detects the size of the damage portion based on the diameter of the rim wheel including the rim flange portion.

8. The tire damage detection system according to claim 1, wherein the rim information acquisition unit acquires the rim information including a radial size of a rim flange portion of the rim wheel, and the damage detection unit detects the size of the damage portion based on the diameter of the rim wheel including the rim flange portion.

9. A tire damage detection program for causing a computer to execute:
an image data acquisition processing for acquiring image data including a rim wheel and a tire side part of a tire assembled to the rim wheel;
a rim information acquiring process for acquiring rim information of the rim wheel associated with the tire;
a damage detection process for detecting a damage portion of the tire side part based on the image data, and for detecting a size of the damage portion with reference to a diameter of the rim wheel based on the rim information; and an output processing for outputting information on the damage portion detected by the damage detection processing.

* * * * *